United States Patent
Wu et al.

(10) Patent No.: US 10,282,189 B2
(45) Date of Patent: May 7, 2019

(54) UPDATING PROGRAM CODE STORED IN AN EXTERNAL NON-VOLATILE MEMORY

(71) Applicant: Synaptics Incorporated, San Jose, CA (US)

(72) Inventors: Eric Wu, San Jose, CA (US); Padma Uppalapati, Santa Clara, CA (US); Jackson Philip, San Ramon, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 148 days.

(21) Appl. No.: 15/198,412

(22) Filed: Jun. 30, 2016

(65) Prior Publication Data

US 2018/0004501 A1    Jan. 4, 2018

(51) Int. Cl.
*G06F 9/44* (2018.01)
*G06F 8/65* (2018.01)
*G06F 3/06* (2006.01)

(52) U.S. Cl.
CPC .............. *G06F 8/65* (2013.01); *G06F 3/065* (2013.01); *G06F 3/0619* (2013.01); *G06F 3/0685* (2013.01)

(58) Field of Classification Search
CPC .............. G06F 8/665; G06F 8/61; G06F 8/66
See application file for complete search history.

(56) References Cited

U.S. PATENT DOCUMENTS

| | | | |
|---|---|---|---|
| 5,960,445 A | 9/1999 | Tamori et al. | |
| 6,085,299 A | 7/2000 | Angelo et al. | |
| 6,360,357 B1 | 3/2002 | Di | |
| 6,401,202 B1 | 6/2002 | Abgrall | |
| 6,505,278 B1 | 1/2003 | Piwonka et al. | |
| 6,928,362 B2 | 8/2005 | Meaney | |
| 7,047,128 B2 | 5/2006 | Dudel et al. | |
| 7,055,148 B2 | 5/2006 | Marsh et al. | |
| 7,188,238 B2 | 3/2007 | Bulusu et al. | |
| 7,310,725 B2 | 12/2007 | Zimmer et al. | |
| 7,426,633 B2 | 9/2008 | Thompson et al. | |
| 7,472,380 B1 | 12/2008 | Rao et al. | |
| 7,814,480 B2 * | 10/2010 | Sakuda ...................... G06F 8/65 709/203 |
| 7,990,797 B2 | 8/2011 | Moshayedi et al. | |
| 8,291,226 B2 | 10/2012 | Chun et al. | |
| 8,339,286 B2 * | 12/2012 | Cordeiro ............... G06F 3/0418 341/20 |
| 8,365,018 B2 | 1/2013 | McIntosh et al. | |

(Continued)

FOREIGN PATENT DOCUMENTS

WO    2008063262 A2    5/2008
WO    2010093356 A1    8/2010

*Primary Examiner* — Wei Y Zhen
*Assistant Examiner* — Brahim Bourzik
(74) *Attorney, Agent, or Firm* — Ferguson Braswell Fraser Kubasta PC

(57) ABSTRACT

In a method of updating program code in an external non-volatile memory, updated program code is received at an Application Specific Integrated Circuitry (ASIC). The updated program code is received from a host device. The updated program code is stored in a volatile memory of the ASIC. The ASIC performs operations. The updated program code is copied from the volatile memory to a non-volatile memory while performing the operations. The non-volatile memory is located external to the ASIC.

19 Claims, 6 Drawing Sheets

(56) References Cited

U.S. PATENT DOCUMENTS

| | | | |
|---|---|---|---|
| 8,694,717 B2* | 4/2014 | Ishimura | G06F 8/65 |
| | | | 711/103 |
| 8,848,745 B2 | 9/2014 | Taskiran et al. | |
| 9,116,830 B2 | 8/2015 | North et al. | |
| 9,152,428 B2 | 10/2015 | Sarangshar | |
| 9,229,704 B2 | 1/2016 | Throop et al. | |
| 2005/0229172 A1* | 10/2005 | Tu | G06F 8/65 |
| | | | 717/168 |
| 2006/0143600 A1 | 6/2006 | Cottrell et al. | |
| 2007/0067581 A1* | 3/2007 | Baek | G06F 9/4406 |
| | | | 711/153 |
| 2010/0250911 A1* | 9/2010 | Trebbels | G05B 19/042 |
| | | | 713/2 |
| 2011/0107049 A1* | 5/2011 | Kwon | G06F 11/004 |
| | | | 711/165 |
| 2012/0044158 A1* | 2/2012 | Chang | G06F 3/0416 |
| | | | 345/173 |
| 2012/0249476 A1* | 10/2012 | Schwartz | G06F 3/0418 |
| | | | 345/174 |
| 2014/0108481 A1 | 4/2014 | Davis et al. | |
| 2014/0152324 A1* | 6/2014 | Schwartz | G06F 3/0416 |
| | | | 324/658 |
| 2014/0267217 A1* | 9/2014 | Lillie | G09G 3/20 |
| | | | 345/214 |
| 2015/0091587 A1* | 4/2015 | Shepelev | G06F 3/044 |
| | | | 324/658 |
| 2015/0227229 A1* | 8/2015 | Schwartz | G06F 3/044 |
| | | | 345/174 |
| 2015/0261356 A1* | 9/2015 | Shepelev | G06F 3/044 |
| | | | 345/174 |
| 2017/0250818 A1* | 8/2017 | Deierling | G06F 21/572 |

* cited by examiner

UPDATING PROGRAM CODE STORED IN AN EXTERNAL NON-VOLATILE MEMORY

BACKGROUND

Input devices including proximity sensor devices also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system. Many proximity sensor devices include program code.

SUMMARY

According to some embodiments, in a method of updating program code in an external non-volatile memory, updated program code is received at an Application Specific Integrated Circuitry (ASIC). The updated program code is received from a host device. The updated program cod is stored in a volatile memory of the ASIC. The ASIC performs operations. The updated program code is copied from the volatile memory to a non-volatile memory while performing the operations. The non-volatile memory is located external to the ASIC.

According to some embodiments, an Application Specific Integrated Circuit (ASIC) comprises a volatile memory, a processor, and first and second communications interfaces. The first communication interface is configured to couple with a host device. The host device is external to the ASIC. The second communication interface is coupled with the volatile memory and configured to couple with a non-volatile memory. The non-volatile memory is located external to the ASIC. The processor is coupled with the volatile memory, the first communication interface, and the second communication interface. The processor is configured to: receive updated program code from the host device via the first communication interface; store the updated program code in the volatile memory; perform operations using the updated program code; and copy the updated program code from the volatile memory to the non-volatile memory via the second communication interface. According to some embodiments, the ASIC comprises a processing system that may be used for touch sensing of input objects.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and.

DESCRIPTION OF EMBODIMENTS

Figure 1:
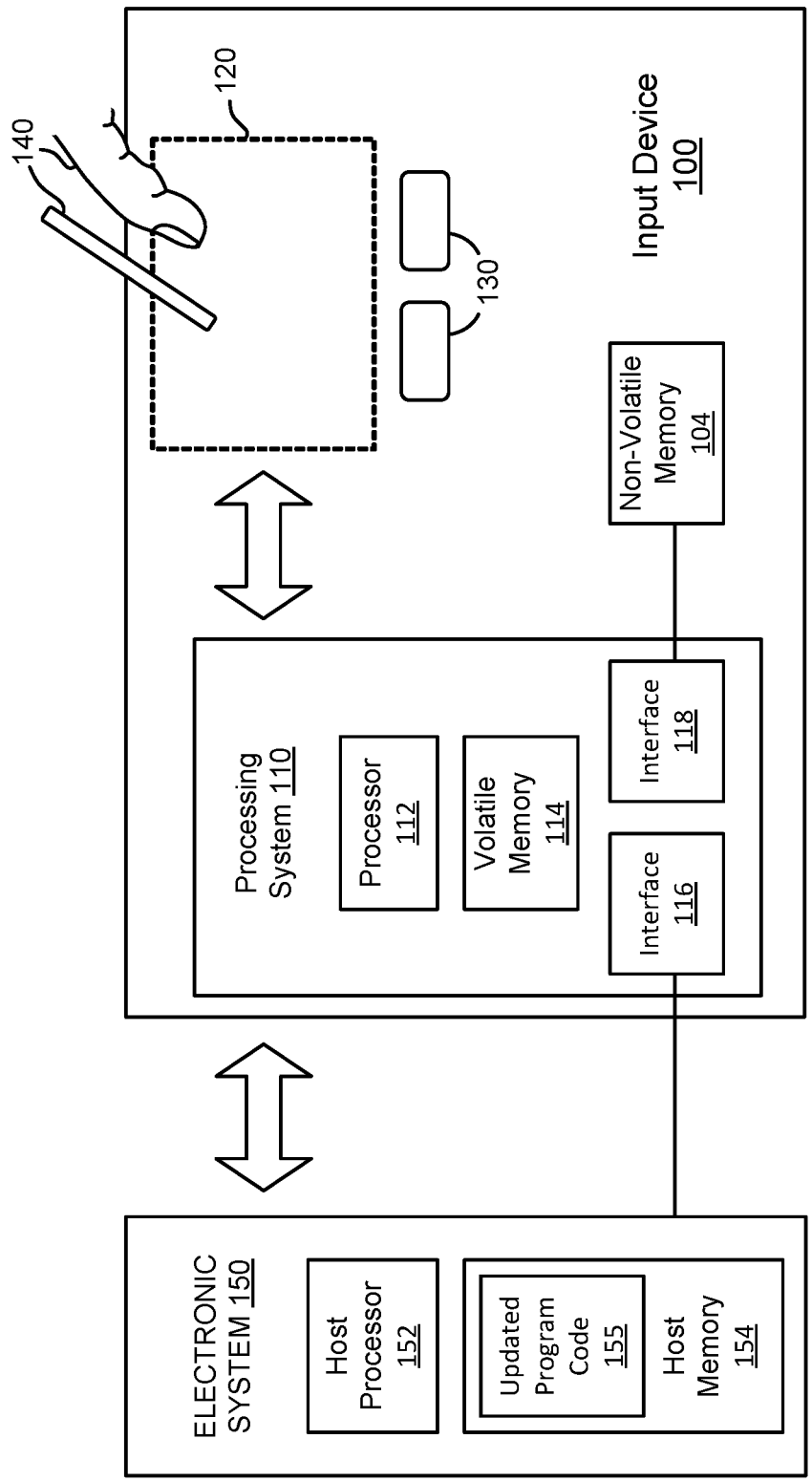
FIG. 1 is a block diagram of an example input device coupled with a host electronic system/device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device that includes an integrated circuit, processing system, component, or the like which stores its program code (e.g., firmware, software, etc.) on a non-volatile memory located external to the integrated circuit. In other embodiments it may be a different integrated circuit, processing system, component, or the like that is disposed within the host stores its program code (e.g., firmware, software, etc.) in a memory that is external to the integrated circuit, processing system, or component. Utilizing techniques described herein, efficiencies may be achieved by reducing a delay experienced by a user of a host device during updating of program code on the non-volatile memory. Conventional techniques for reflashing (i.e., overwriting and updating) a rewritable portion of such an external non-volatile memory can cause a user to experience delays such as non-responsiveness of a host device, a hosted application, or a hosted component/function while the reflashing is taken place. However, by employing the techniques described herein, delays experienced by a user when overwriting/updating program code stored on the external non-volatile memory of an integrated circuit, a processing system, or other component can be reduced by such an extent, compared with conventional reflashing techniques, that the delays are effectively non-existent from a user experience perspective.

Discussion begins with a description of an example input device with which or upon which various embodiments described herein may be implemented. The input device may include an integrated circuit such as an Application Specific Integrated Circuit (ASIC), a processing system, or other component that controls one or more functions of the input device. The input device may be coupled with or disposed as a portion of a host electronic system/device. An example sensor electrode pattern is then described. This is followed by description of an example processing system and some components thereof which may operate one or more sensor electrodes of a sensor electrode pattern. The processing system may be utilized with or as a portion of an input device, such as a capacitive sensing input device. Operation of the input devices, processing systems, and components thereof are then further described in conjunction with description of an example method of updating program code in an external non-volatile memory, where the external non-volatile memory stores program code for an integrated circuit or component and provides the program code to volatile memory of the integrated circuit, processing system, or component.

Example Input Device

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system/device 150, or can be physically separate from electronic system 150. Electronic system/device 150 may act as a host for input device 100. Because of this host arrangement, processor 152 electronic system/device 150 may be referred to as host processor 152 and memory 154 of electronic system/device 150 may be referred to as host memory 154

As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use acoustic, ultrasonic, capacitive, elastive, resistive, inductive, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120. In this manner, in some embodiments, the resulting signal represents noise detected in the operating environment of sensing region 120. For example, display noise of a nearby or co-located (e.g., overlapping) display may be represented in the resulting signal that is received during transcapacitive sensing.

In FIG. 1, a processing system 110 is shown as part of input device 100. Processing system includes a processor 112, a volatile memory 114, a first interface 116 configured for communicating with electronic system 150 and a second interface 118 configured for communication with other portions of input device 100 such as non-volatile memory 104. Processing system 110 is configured to operate at least one aspect of the hardware of input device 100. In some embodiments, for example processing system operates to detect input in sensing region 120, operates a touch pad, operates a touch screen, and/or operates an aspect of a display. In some embodiments processing system 110 comprises an application specific integrated circuit (ASIC). In some embodiments, processing system 110 comprises parts of or all of one or more integrated circuits (ICs) and/or other circuitry components. For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes. In some embodiments, processing system 110 also comprises program code in the form of electronically-readable instructions, such as firmware code, software code, and/or the like which direct the operation of it and its processor 110.

Processor 115 is coupled with volatile memory 114, communication interface 116, and communication interface 118 by a communication bus or other suitable means.

Volatile memory 114 may be referred to as a program memory, program random access memory (RAM), or the like. Volatile memory 114 holds the program code while processing system 110 is powered on and operating, and may also be used as storage for operations of processing system 110 which require a memory buffer or other temporary storage of information.

Non-volatile memory 104 may be a memory such as a FLASH type memory which is electrically writable, erasable, and re-writable. The non-volatile storage of the program code for processing system 110 may be in non-volatile memory 104 which is located external to processing system 110. The program code may be copied from non-volatile memory 104 to volatile memory 114 at startup, boot, or the like of processing system 110 via interface 118. They are then lost from volatile memory 114 when programming system 110 is shut down or restarted, and then must be copied over again. This copying typically takes a relatively short period of time, such as 100 ms, that is brief enough to be unnoticeable by a user of input device 110 or electronic system 150.

Interface 116 is first communication interface that is configured to couple with a host device such as electronic system/device 150, that is external to processing system 110 (which may be an ASIC) to exchange data.

Interface 118 is a second communication interface configured to couple with both volatile memory 114 and a non-volatile memory 104 that is located external to processing system 110 (which may be an ASIC)

Interfaces 116 and 118 may be the same types of interface or different types of interface. Some examples of interfaces that may be used either or both of interface 116 and interface 118 include, but are not limited to: an Inter-Integrated Circuit (I2C) and a Serial Peripheral Interface (SPI).

In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

In some embodiments, processor 112 is involved in the updating of the program code that is used to operate, configure, or control one or more aspects of processing system 110 and or input device 100. By way of example and not of limitation, in various embodiments, the updated program code may comprise one or more of: ASIC configuration information; touch sensing frequency information; display operation information; sensor electrode drive information; and capacitive sensing mode information. From time to time to correct errors, provide new features, or for other reasons updated program code 155 may be provided to electronic system 150 for passing on to processing system 110, such as on boot or startup of processing system 110 or at the occurrence of a particular time or event. Processor 112 may receive updated program code 155 from electronic system 150 (e.g., host memory 154) via communication interface 116, then direct the temporary storage of the updated program code 155 in volatile memory 114. It typically takes only a brief period of time for receipt and storage into volatile memory 114. For example, in some embodiments the time for receipt and storage of the updated program code 155 in volatile memory 114 may be on the order of around 100 ms or less. This storage is temporary in the sense that a power loss, restart, or reboot would erase the updated program code 155 from volatile memory 114. Once this updated program code 155 has all been received and stored in volatile memory 114, processor 112 and processing system 110 are able to perform their operations using the updated program code 155. As will be described herein, after the updated program code 155 is stored in volatile memory 114, processor 112 may direct that it is copied from volatile memory 114 to non-volatile memory 104 via communication interface 118, in some embodiments, the copying may from volatile memory 114 to non-volatile memory 104 may take place before the updated program is received in its entirety into volatile memory 114. In some embodiments, all or some portion of the copying to non-volatile memory 104 may take place while (i.e., overlap in time with) processing system 110 and/or input device 100 are performing operations, such as input sensing operations, using the updated program code 155.

The copying to non-volatile memory 104, which may be a FLASH type memory, takes significantly longer than the copying of the updated program code 155 from electronic system device 150 to volatile memory 114 and also takes significantly longer that copying the updated program code 155 from non-volatile memory 104 to volatile memory 114. This difference in copying times is due to time it takes to buffer and write portions of memory to FLASH type memory, and not to constraints of interface 118. These buffering and writing delays do not exist with respect to storing information in volatile memory 114. In some embodiments the time to fully transfer and store the updated program code 155 into non-volatile memory 104 may be a an order of magnitude or more longer than the time it takes to store updated program code 155 into volatile memory 114. The user of input device 100 and/or electronic system/device 150 is not inconvenienced by the time it takes to store the updated program code 155 into non-volatile memory 104, as processor 112 is able to perform the copying while normal operations of processing system 110 and or input device 100 are ongoing.

For example, processor 112 may drive a sensor electrode for capacitive sensing while also in the process of copying the updated program code 155 from volatile memory 114 to non-volatile memory 104 via interface 118. Likewise, processor 112 may process capacitive sensing data received from at least one sensor electrode to determine a position of an input object 140 relative to a sensing region 120 of the at least one sensor electrode 160/170, while also in the process of effecting the copying the updated program code 155 from volatile memory 114 to non-volatile memory 104 via interface 118.

Example Sensor Electrode Pattern

Figure 2:
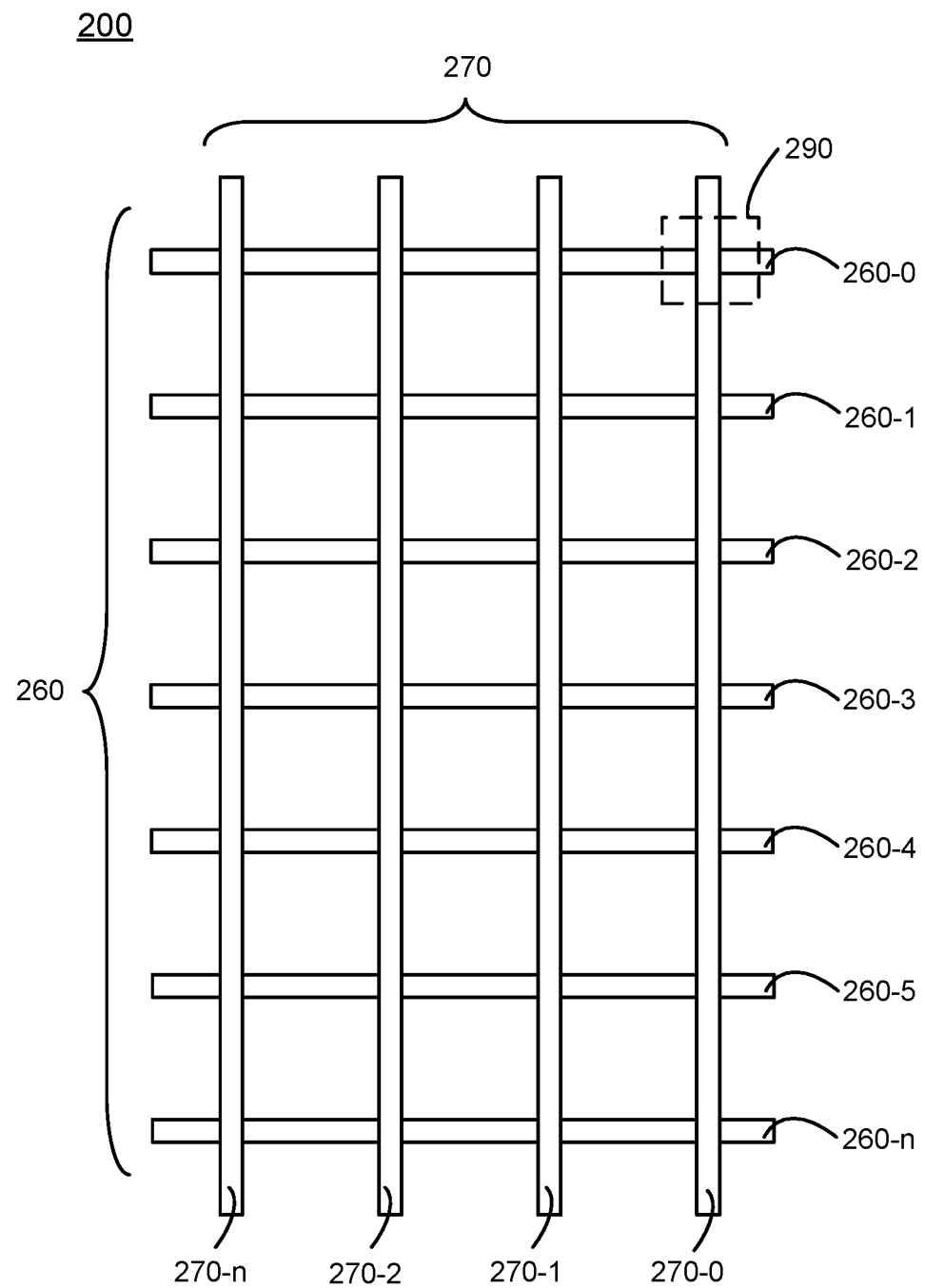
FIG. 2 shows a portion of an example sensor electrode pattern which may be utilized in a sensor to generate all or part of the sensing region of an input device, such as a touch sensor device, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode; patterns with a single set of sensor electrodes; patterns with two sets of sensor electrodes disposed in a single layer (without overlapping); patterns with two sets of sensor electrodes disposed in a single layer employing jumpers at crossover regions between sensor electrodes; patterns that utilize one or more display electrodes of a display device such as one or more segments of a common voltage ($V_{COM}$) electrode; patterns with one or more of source electrodes, gate electrodes, anode electrodes, and cathode electrodes; and patterns that provide individual button electrodes.

The illustrated sensor electrode pattern is made up of a first plurality of sensor electrodes 270 (270-0, 270-1, 270-2 . . . 270-n) and a second plurality of sensor electrodes 260 (260-0, 260-1, 260-2 . . . 260-n) which overlay one another, in this example. In many embodiments, processing system 110 is configured to operate the second plurality of sensor electrodes 260 as transmitter electrodes by driving them with transmitter signals and the first plurality of sensor electrodes 270 as receiver electrodes by receiving resulting signals with them. Other embodiments, may reverse the roles of sensor electrodes 260 and 270. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

When accomplishing absolute capacitive measurements, a capacitive pixel may correspond to an area of absolute capacitances associated with a single sensor electrode being utilized for absolute capacitive sensing. In different sensor patterns that sensor pattern 200, sensor electrodes may be arranged in a manner, such as an array of small box shapes, and absolute capacitive sensing on individual sensor electrodes of the array may result in absolute capacitive pixels that can be used to form an absolute capacitive image.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels where transmitter electrodes 260 and receiver electrodes 270 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

It should be appreciated that numerous sensor electrodes of a sensor electrode pattern, such as sensor electrode pattern 200, can be operated at the same time or at different times for absolute capacitive sensing. It should also be appreciated that sensor electrodes of a sensor electrode pattern, such as sensor electrode pattern 200, can be driven with digital codes for absolute capacitive sensing.

Example Processing System

Figure 3:
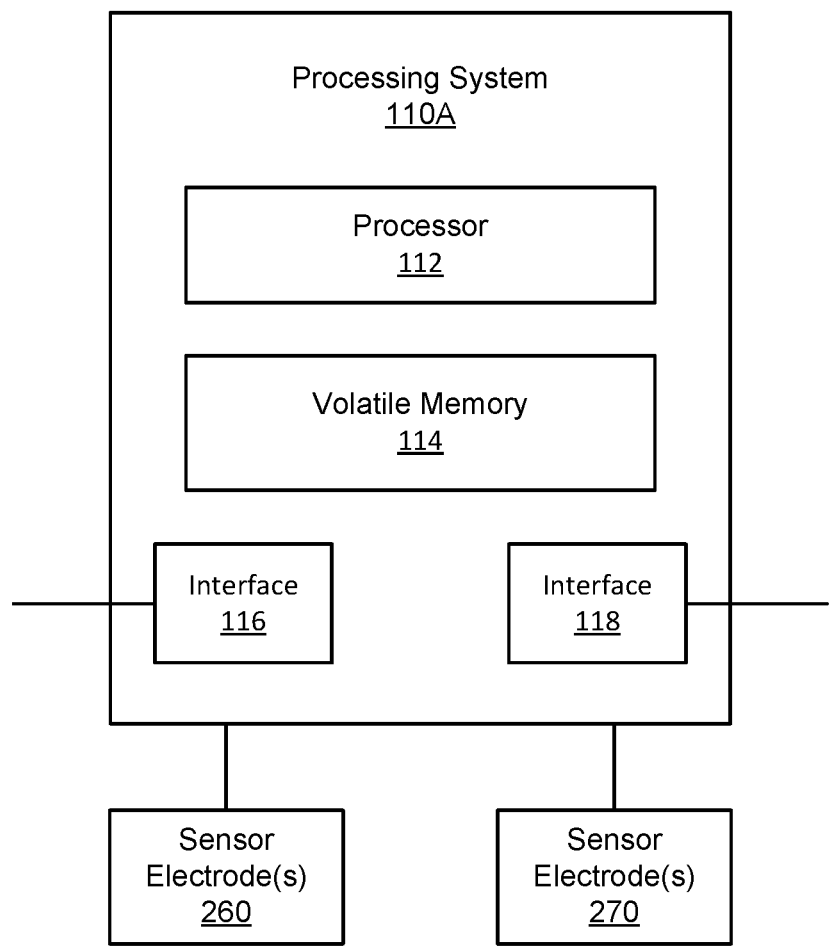
FIG. 3 illustrates a block diagram of some components of an example processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. As described herein, input device 110 is a capacitive sensing input device. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system. In some embodiments, processing system 110A may be coupled with and used to operate or provide information to one or more components of an electronic system 150, such as to a display, a wireless transceiver, an input device (e.g., an audio input device, an image input device, a proximity sensing input device, or other user input device).

In various capacitive sensing embodiments, processing system 110A includes, among other components and operations that have been previously described herein, logic and circuitry for operating sensor electrodes of a sensor electrode pattern for capacitive sensing and for processing resulting signals from sensor electrodes to determine the presence and location of an input object 140 with respect to a sensing region 120. Processing system 110A and/or components thereof may be coupled with sensor electrodes of a sensor electrode pattern, such as sensor electrode pattern 200, among others. For example, processing system 110A is coupled with one or more sensor electrodes (260, 270) of a sensor electrode pattern (e.g., sensor electrode pattern 200) of input device 100.

In various embodiments, processing system 110A comprises sensor circuitry and logic that operate to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing. The capacitive sensor operating aspects of processing system 110A may be implemented as hardware (e.g., hardware logic and/or other circuitry) and/or as a combination of hardware and instructions stored in a non-transitory manner in a computer readable storage medium, such as in volatile memory 114.

Processing system 110A is configured to acquire transcapacitive resulting signals by transmitting with a first one of a plurality of sensor electrodes of the input device and receiving with a second one of the plurality of sensor electrodes. During transcapacitive sensing, processing system 110A operates to drive (i.e., transmit) transmitter signals on one or more sensor electrodes of a first plurality of sensor electrodes (e.g., one or more of transmitter electrodes 260). A transmitter signal may be a square wave, trapezoidal wave, or some other waveform. In a given time interval, processing system 110A may drive or not drive a transmitter signal (waveform) on one or more of the plurality of sensor electrodes. Processing system 110A may also be utilized to couple one or more of the first plurality of sensor electrodes to high impedance, ground, or to a constant voltage when not driving a transmitter signal on such sensor electrodes. In some embodiments, when performing transcapacitive sensing, processing system 110A drives two or more transmitter electrodes of a sensor electrode pattern at one time. When driving two or more sensor electrodes of a sensor electrode pattern at once, each of the transmitter signals may be coded according to a code of a plurality of codes. The code may be altered, such as lengthening or shortening the code. Processing system 110A also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that processing system 110A may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, processing system 110A operates to drive (i.e., transmit) a signal on to and receive a resulting signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, processing system 110A includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. Processing system 110A may include multiple amplifiers utilized in any of these manners. For example, in some embodiments, a first amplifier may be coupled with a first sensor electrode while a second amplifier is coupled with a second sensor electrode.

An input object determining portion of processing system 110A may be implemented as hardware (e.g., hardware logic and/or other circuitry) and/or as a combination of hardware and instructions stored in a non-transitory manner in a computer readable storage medium, such as in volatile memory 114.

An input object determining portion of processing system 110A operates to compute/determine a measurement of a change in a transcapacitive coupling between a first and second sensor electrode during transcapacitive sensing. In such operation, processing system 110A, then uses such measurements to determine the positional information comprising the position of an input object (if any) with respect to sensing region 120. The positional information can be determined from a transcapacitive image. The transcapacitive image is determined by processing system 110A based upon resulting signals acquired by processing system 110A. The resulting signals are used as or form capacitive pixels representative of input(s) relative to sensing region 120. It is appreciated that processing system 110A operates to decode and reassemble coded resulting signals to construct a transcapacitive image from a transcapacitive scan of a plurality of sensor electrodes.

In embodiments where absolute capacitive sensing is performed with sensor electrodes 260 and/or 270, processing system 110A also operates to compute/determine a measurement of absolute capacitive coupling to a sensor electrode. For example, processing system 110A operates to determine an absolute capacitance of the sensor electrode (e.g., sensor electrode 270-0) after a sensing signal has been driven on the sensor electrode.

In some embodiments, processing system 110A comprises decision making logic which directs one or more portions of processing system 110A to operate in a selected one of a plurality of different operating modes based on various inputs.

Processing system 110A may be utilized, as has been previously described herein to receive updated program code 155 from host electronic system/device 150. In some embodiments, the updated program code 155 may be updated firmware, software, or other instructions. The updated program code 155 may comprise ASIC configuration information for an ASIC upon which processing system 110A is located. The updated program code 155 may comprise touch sensing frequency information such as information the frequency in Hertz of a signal to be driven onto one or more sensor electrodes 160, 170. In some embodiments, the updated program code 155 may comprise display operation information, such as information that is used to operate a display where a touch sensor and display are overlaid or utilize some common component(s). The updated program code 155 may include drive information for sensor electrodes 160/170 such as techniques for driving, order for driving, values of voltage or charge to drive, and the like. The updated program code 155 may comprise capacitive sensing mode information such as when/how to utilize absolute capacitive sensing, when/how to use transcapacitive sensing, when/how to utilize interference avoidance modes, and the like. In some embodiments, the updated program code may include updates for one or more of portions of processing system 110A.

Processor 112 may receive the updated program code 155 from electronic system 150 (e.g., host memory 154) via communication interface 116, then direct the temporary storage of the updated program code 155 in volatile memory 114. After the updated program code 155 is stored in volatile memory 114, processor 112 may direct that it is copied from volatile memory 114 to non-volatile memory 104 via communication interface 118. In some embodiments, all or some portion of the copying to non-volatile memory 104 may take place while (i.e., overlap in time with) processing system 110A and/or input device 100 are performing operations, such as input sensing operations, using the updated program code 155. For example, processor 110A may perform capacitive sensing to determine the presence and/or location of an input object 140 with respect to sensing region 120.

As was previously discussed, the copying to non-volatile memory 104, which may be a FLASH type memory, takes significantly longer than the copying of the updated program code 155 from electronic system/device 150 to volatile memory 114 and also takes significantly longer than copying the updated program code 155 from non-volatile memory 104 to volatile memory 114. The user of input device 100 and/or electronic system/device 150 is not inconvenienced by the time it takes to store the updated program code 155 into non-volatile memory 104, as processor 112 is able to perform the copying while normal operations of processing system 110A and or input device 100 are ongoing.

For example, processor 112 may drive a sensor electrode for capacitive sensing while also in the process of copying the updated program code 155 from volatile memory 114 to non-volatile memory 104 via interface 118. Likewise, processor 112 may process capacitive sensing data received from at least one sensor electrode 160, 170 to determine a position of an input object 140 relative to a sensing region 120 of the at least one sensor electrode 160/170, while also in the process of effecting the copying the updated program code 155 from volatile memory 114 to non-volatile memory 104 via interface 118. In some embodiments, processing system 112 may send a completion message to electronic system/device 150 via interface 116 after completion of copying the updated program code 155 from volatile memory 114 to non-volatile memory 118.

Example Methods of Operation

Figure 4A:
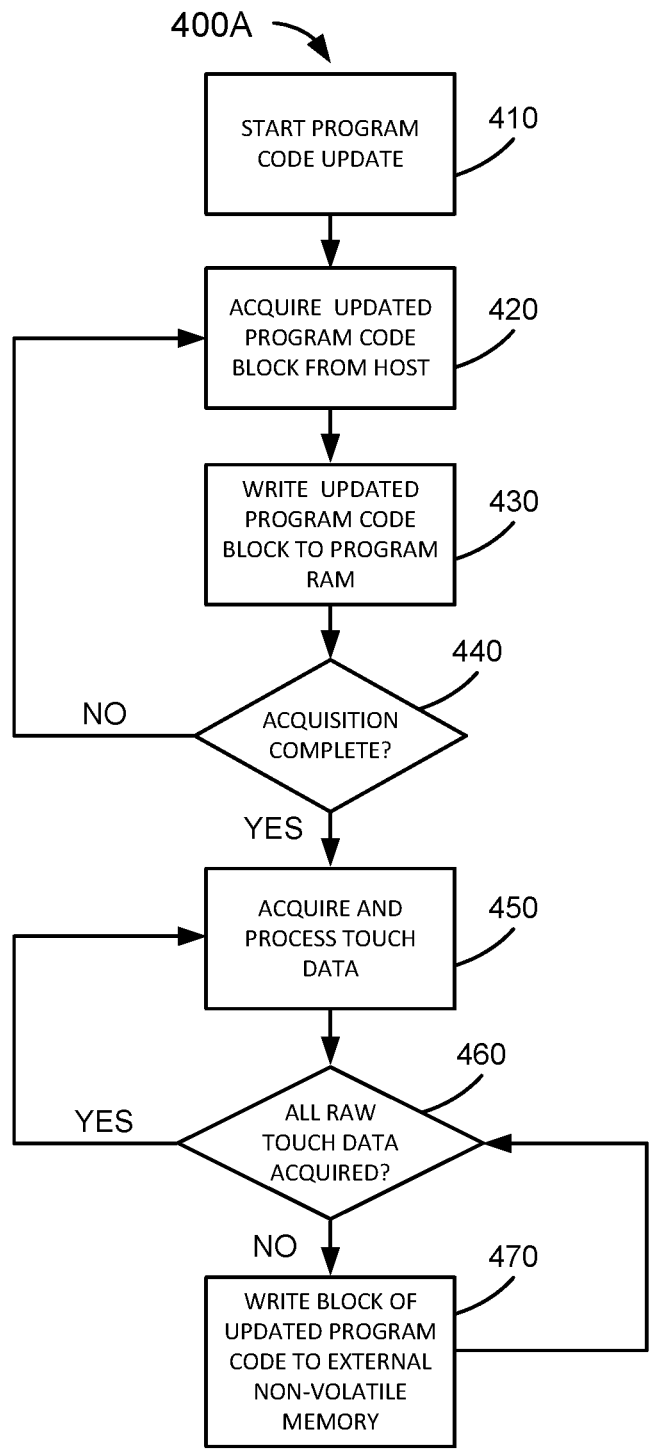
FIG. 4A illustrates a flowchart for updating program code in an external non-volatile memory, according to various embodiments.

FIG. 4A illustrates a flowchart 400A for updating program code in an external non-volatile memory, according to various embodiments.

At block 410 of flowchart 400A, the program code update for a processing system 110 is initiated, such as in response to the occurrence of a time or an event. The flowchart then proceeds to block 420.

At block 420 of flowchart 400A, processor 112 of processing system 110 acquires a block of updated program code 155 from a host, such as from host memory 154 of electronic system/device 150, via interface 116. The flowchart then proceeds to block 430.

At block 430 of flowchart 400A, processor 112 of processing system 110 writes the updated program code block to program random access memory (i.e., volatile memory 114) of processing system 110. The flowchart then proceeds to decision block 440.

At block 440 of flowchart 400A, processor 112 of processing system 110 checks to see if the acquisition of the updated program code 155 is complete. If so, the flowchart proceeds to block 450. If not the flowchart loops back to block 420.

At block 450 of flowchart 400A, processor 112 begins operating to acquire and process touch data with capacitive sensor(s) 160/170. This may involve operating using the updated program code 155 that is now stored in volatile memory 114. The acquisition and processing of touch data has been described above in conjunction with the description of the operation of processing system 110A to acquire and process resulting signals. The acquisition and/or processing of touch data may take place under instruction provided by the updated program code 155 stored in volatile memory 114. After acquisition and/or processing of touch data begins, the flowchart proceeds to decision block 460.

At block 460 of flowchart 400A, processor 112 of processing 112 determines if all touch data has been acquired. For example, processor 112 determines whether all sensor electrodes 160, 170 that are being driven been driven and/or whether all expected resulting signals been received from sensor electrodes 160, 170. If all touch data has been acquired, the flowchart loops back to block 450 to process the touch data (i.e., resulting signals) to determine if an input object 140 is present and, if so. what its position is relative sensing region 120. If not all touch data has been acquired, then the flowchart proceeds to block 470.

At block 470 of flowchart 400A, processor 112 of processing system 110 writes a block of the updated program code from volatile memory 114 to external non-volatile memory 104 via interface 118, and then the flowchart loops back to decision block 460.

Figure 4B:
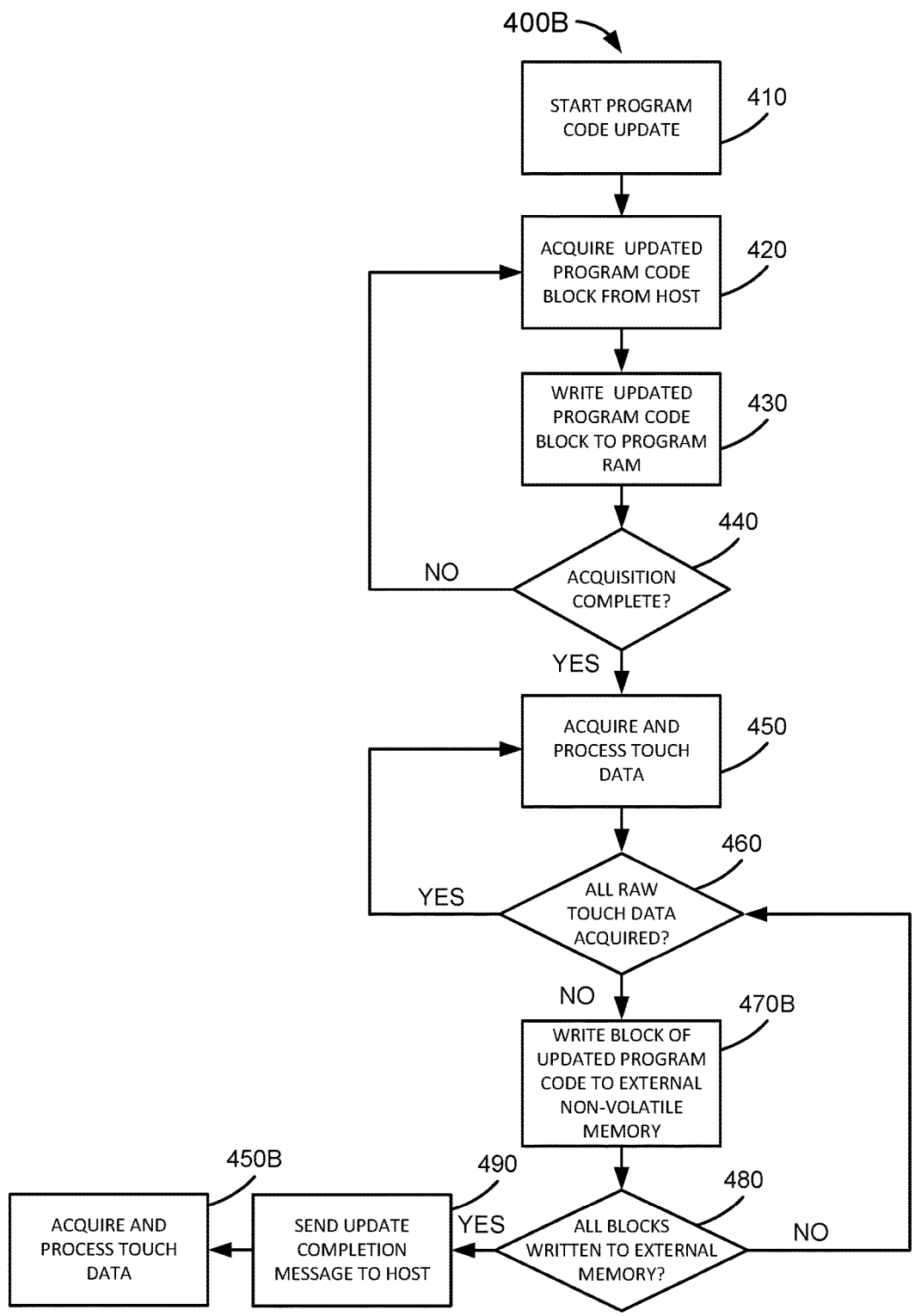
FIG. 4B illustrates a flowchart for updating program code in an external non-volatile memory, according to various embodiments.

FIG. 4B illustrates a flowchart 400B for updating program code in an external non-volatile memory, according to various embodiments.

Blocks 410-460 of flowchart 400B are the same as have been illustrated and described in flowchart 400A.

At block 470B of flowchart 400A, processor 112 of processing system 110 writes a block of the updated program code from volatile memory 114 to external non-volatile memory 104 via interface 118, and then the flow chart proceeds to decision block 480.

At block 480 of flowchart 400B, processor 112 of processing system 110 determines if all blocks of the updated program code 155 have been written to external non-volatile memory 104. If not, the flowchart loops back to block 460. If so, the flowchart moves on to block 490.

At block 490 of flowchart 400B, processor 112 of processing system 110 sends a message to electronic system/device 150 to indicate that the program code update has been successfully completed. The flowchart then moves to block 450B.

At block 450B of flowchart 400B, processor 112 continues operating to acquire and process touch data with capacitive sensor(s) 160/170 in the manner previously described in block 450.

Figure 5A:
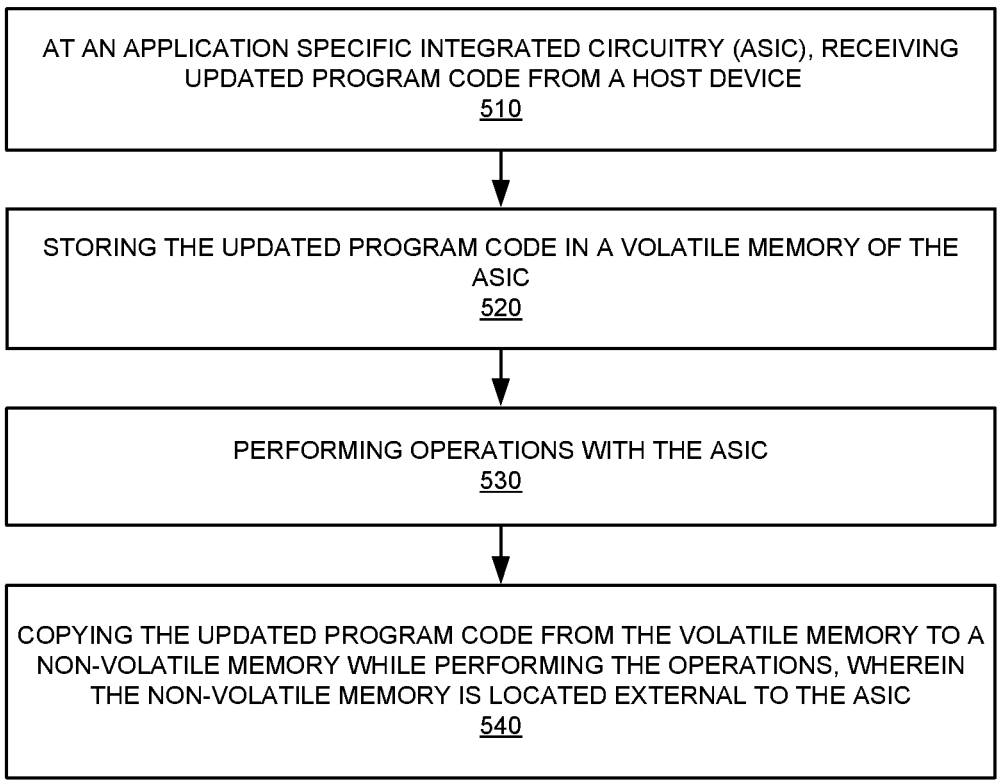
FIGS. 5A and 5B illustrate a flow diagram of an example method of updating program code in an external non-volatile memory, according to various embodiments.
Figure 5B:
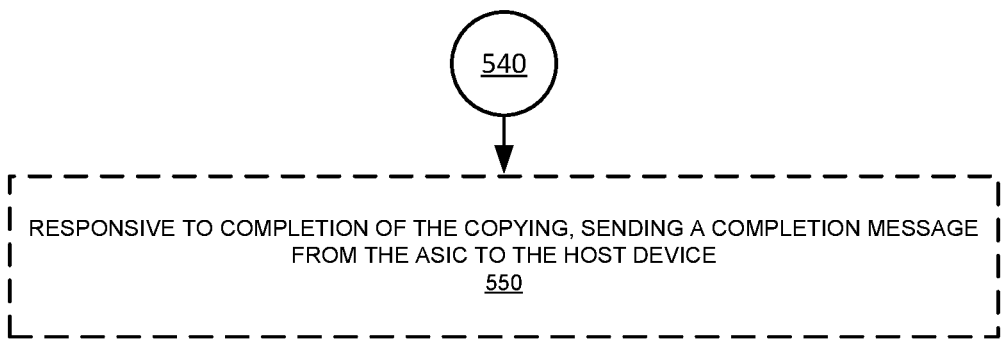

FIGS. 5A and 5B illustrate a flow diagram 500 of an example method of updating program code in an external non-volatile memory, according to various embodiments. The external non-volatile memory is external to a component or integrated circuit that utilizes the program code stored in the non-volatile memory. Procedures of this method will be described with reference to elements and/or components of one or more of FIGS. 1, 2, 3, 4A and 4B. It is appreciated that in some embodiments, the procedures may be performed in a different order than described, that some of the described procedures may not be performed, and/or that one or more additional procedures to those described may be performed.

With reference to FIG. 5A, at procedure 510 of flow diagram 500, in one embodiment, at an Application Specific Integrated Circuitry (ASIC), updated program code is received from a host device. The ASIC can comprise any ASIC that typically operates from program code that: a) runs on an onboard volatile memory; and b) that loads the program code into the onboard non-volatile memory from a copy of the program code that is stored on an non-volatile memory that is located external to the ASIC. The program code and the updated program code may be in the form of firmware, software, or other instructions. The updated program code may be received to reflash and thus update the program code stored on the external non-volatile memory. In some embodiments the updated program code is received from the host device upon boot-up or restart of the ASIC. In one embodiment, the ASIC may be a processing system, such as processing system 100/100A, that receives the updated program code 155 via interface 116 from electronic system/device 150 (which is the host for processing system 110 and input device 100).

With continued reference to FIG. 5A, at procedure 520 of flow diagram 500, in one embodiment, the updated program code is stored in a volatile memory of the ASIC. This may comprise, in some embodiments, processor 112 directing the storage of the updated program code 155 in volatile memory 114.

With continued reference to FIG. 5A, at procedure 530 of flow diagram 500, in one embodiment, operations are performed with the ASIC. For example, as soon as the updated program code 155 is fully received and stored in volatile memory 114, processing system 110 may operate using the updated program code 155. This may comprise any performing any operations that that the ASIC is configured to perform. For example, in an embodiment where the ASIC comprises a processing system 100 for sensing input objects, this may comprise performing touch sensing operations using the updated program code 155. In a particular embodiment where the input sensing is done via capacitive sensing, this may comprise the ASIC driving a sensor electrode 160, 170 for capacitive sensing based on/using the updated program code 155.

With continued reference to FIG. 5A, at procedure 540 of flow diagram 500, in one embodiment, the updated program code is copied from the volatile memory to a non-volatile memory while performing the operations, wherein the non-volatile memory is located external to the ASIC. For example, if processing system 100 is the ASIC, this can comprise perforating touch sensing operations while copying the updated program code 155 from volatile memory 114 via interface 118 to non-volatile memory 104, such that the touch sensing operations and the copying of the updated program code 155 at least partially overlap in time. This may further comprise copying at least a portion of the updated program code 155 from the volatile memory 114 to the non-volatile memory 104 while performing processing of capacitive sensing data such as resulting signals received from one or more sensor electrodes 160, 170 to determine whether an input object 140 is present in sensor region 120 and if so what its position is relative to sensing region 120.

With reference to FIG. 5B, as illustrated in procedure 550 of flow diagram 500, in some embodiments, the method as described in 510-540 further comprises responsive to completion of the copying, sending a completion message from the ASIC to the host device. Once the updated program code 155 is fully copied to and stored onto non-volatile memory 104, processing system 110 may send a completion message to electronic system/device 150 to confirm that the reflash/storage of the updated program code 155 is complete and the program code in non-volatile memory 104 has been updated.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:

1. A method of updating program code in an external non-volatile memory, said method comprising:
    at an application specific integrated circuitry (ASIC) of an input device, receiving updated program code from a host device, wherein the host device is external to the input device and communicatively coupled to the input device;
    storing said updated program code in a volatile memory of said ASIC;
    executing instructions of the updated program code in the volatile memory, the instructions performing operations comprising acquiring and processing touch data with said ASIC, wherein the touch data is acquired from sensing electrodes of the input device;
    determining whether the touch data has been acquired from all the sensing electrodes being driven;
    in response to determining that the touch data has not been acquired from all the sensing electrodes,
        writing a block of the updated program code from the volatile memory to a non-volatile memory of the input device; and
    in response to determining that the touch data has been acquired from all the sensing electrodes, processing the acquired touch data to determine a presence of an input object near the input device.

2. The method of claim 1, further comprising:
    based on determining that all blocks of the updated program code have been written from the volatile memory to the non-volatile memory of the input device, sending a completion message from said ASIC to said host device.

3. The method of claim 1, wherein said receiving updated program code from a host device comprises:
    receiving said updated program code from said host device upon boot-up of said ASIC.

4. The method of claim 1, wherein said acquiring the touch data and said writing the block of the updated program code at least partially overlap in time.

5. The method of claim 1, wherein said acquiring the touch data comprises:
    driving sensor electrodes for capacitive sensing.

6. An application specific integrated circuit (ASIC) of an input device, the ASIC comprising:
    a volatile memory;
    a first communication interface coupled with a host device, said host device external to said ASIC and to said input device; a second communication interface coupled with said volatile memory and with a non-volatile memory, said non-volatile memory located in the input device, external to said ASIC; and
    a processor coupled with said volatile memory, said first communication interface, and said second communication interface, said processor configured to:
        receive updated program code from said host device via said first communication interface;
        store said updated program code in said volatile memory;
        execute instructions of the updated program code in the volatile memory, the instructions performing operations comprising acquiring and processing touch data, wherein the touch data is acquired from sensing electrodes of the input device;
        determine whether the touch data has been acquired from all the sensing electrodes being driven;
        in response to determining that the touch data has not been acquired from all the sensing electrodes,
        write a block of the updated program code from the volatile memory to the non-volatile memory of the input device; and
        in response to determining that the touch data has been acquired from all the sensing electrodes, process the acquired touch data to determine a presence of an input object near the input device.

7. The ASIC of claim 6, wherein said acquiring the touch data comprises:
    driving sensor electrodes for capacitive sensing.

8. The ASIC of claim 6, wherein a first speed of communication of said updated program code between said host device and said ASIC is faster than a second speed of communication of said updated program code between said ASIC and said non-volatile memory.

9. The ASIC of claim 6, wherein said acquiring the touch data and said writing the block of the updated program code at least partially overlap in time.

10. The ASIC of claim 6, wherein said updated program code comprises information selected from the list of information consisting of: ASIC configuration information; touch sensing frequency information; display operation information; sensor electrode drive information: and capacitive sensing mode information.

11. A processing system for a capacitive sensing input device, said processing system comprising:

a volatile memory; and a processor coupled with said volatile memory, said processor configured to:

receive updated program code from a host device, wherein the host device is external to the capacitive sensing input device and communicatively coupled to the capacitive sensing input device;

store said updated program code in said volatile memory;

execute instructions of the updated program code in the volatile memory, the instructions performing operations comprising acquiring and processing touch data, wherein the touch data is acquired from sensing electrodes of the capacitive sensing input device;

determine whether the touch data has been acquired from all the sensing electrodes being driven;

in response to determining that the touch data has not been acquired from all the sensing electrodes, write a block of the updated program code from the volatile memory to a non-volatile memory of the capacitive sensing input device; and in response to determining that the touch data has been acquired from all the sensing electrodes, process the acquired touch data to determine a presence of an input object near the capacitance sensing input device.

12. The processing system of claim 11, wherein acquiring the touch data comprises driving sensor electrodes for capacitive sensing.

13. The processing system of claim 11, wherein said processor is further configured to:

based on determining that all blocks of the updated program code have been written from the volatile memory to the non-volatile memory of the capacitive sensing input device, send a completion message to said host device.

14. The processing system of claim 11, wherein a first speed of storing said updated program code in said volatile memory is faster than a second speed of copying said updated program code from said volatile memory to said non-volatile memory.

15. The processing system of claim 11, wherein said acquiring the touch data and said writing the block of the updated program code at least partially overlap in time.

16. The processing system of claim 11, wherein said updated program code comprises information selected from the list of information consisting of: application specific integrated circuit (ASIC) configuration information; touch sensing frequency information; display operation information; sensor electrode drive information; and capacitive sensing mode information.

17. The method of claim 1, further comprising:

prior to making the determination that the touch data has been acquired from all the sensing electrodes, writing additional blocks of the updated program code from the volatile memory to the non-volatile memory of the input device.

18. The ASC of claim 6, wherein prior to making the determination that the touch data has been acquired from all the sensing electrodes, additional blocks of the updated program code are written from the volatile memory to the non-volatile memory of the input device.

19. The processing system of claim 11, wherein prior to making the determination that the touch data has been acquired from all the sensing electrodes, additional blocks of the updated program code are written from the volatile memory to the nonvolatile memory of the capacitive sensing input device.

* * * * *